Feb. 2, 1954     A. F. SEELIG, JR     2,668,051
AXLE ASSEMBLY
Filed April 8, 1952
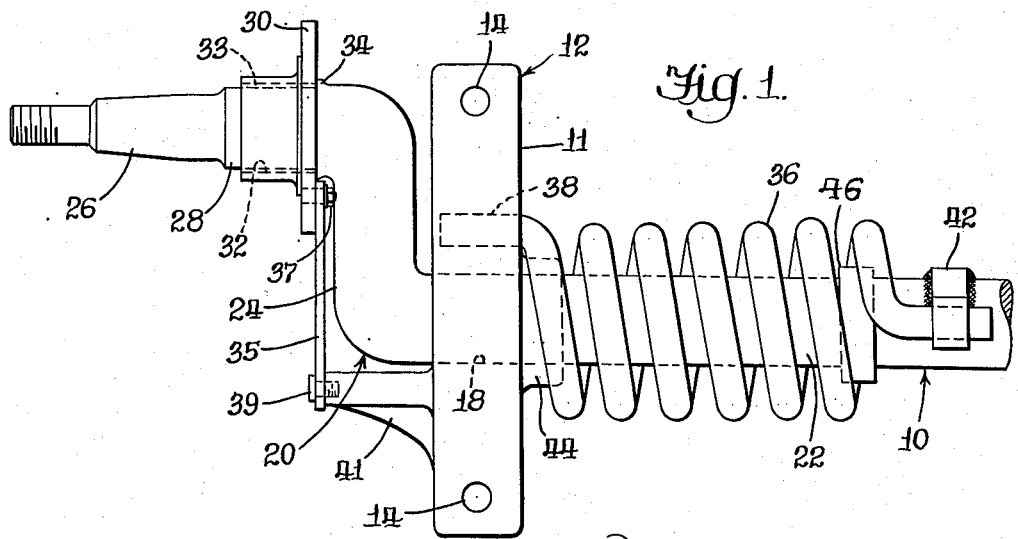
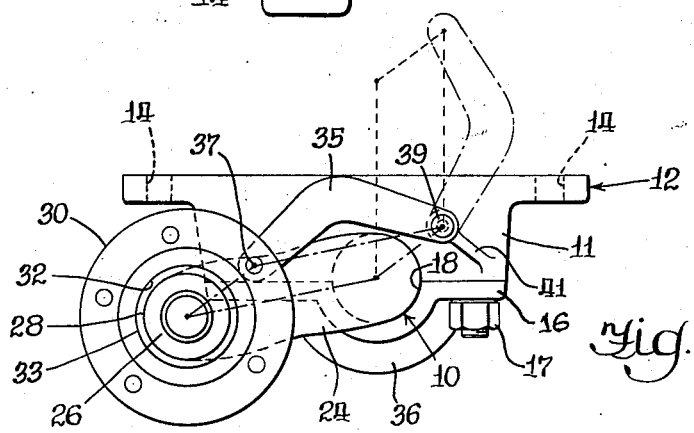
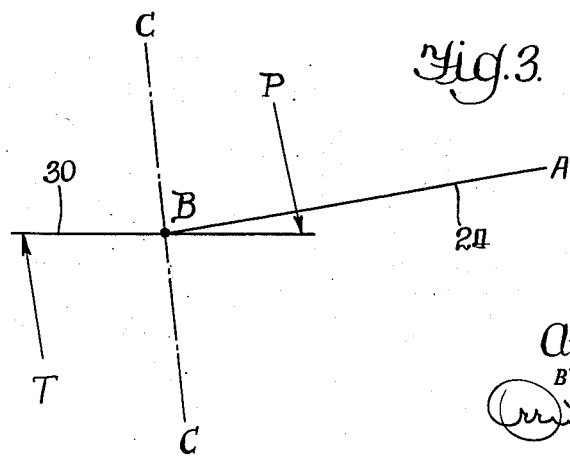
INVENTOR.
Albert F. Seelig, Jr.
BY
O.B. Farmer
Atty.

Patented Feb. 2, 1954

2,668,051

UNITED STATES PATENT OFFICE 2,668,051

AXLE ASSEMBLY

Albert F. Seelig, Jr., Granite City, Ill., assignor to American Steel Foundries, Chicago, Ill., a corporation of New Jersey Application April 8, 1952, Serial No. 281,109

2 Claims. (Cl. 267—58)

My invention relates to a "trail type" axle assembly utilized to support a related vehicle body, and more particularly to a novel design of said assembly that eliminates undesirable movement during the application of a braking torque.

It is a general object of my invention to provide an axle assembly of the character described that eliminates unwanted relative movement of said assembly during application of braking torque thereto.

A more specific object of my invention is to provide a novel movable brake flange in combination with the wheel spindle of the axle assembly.

Another object of my invention is to provide a torque arm to transfer braking torque to the related vehicle body rather than dissipating said torque within the axle assembly.

Other objects of my invention will become apparent in the course of the following description and the drawings, wherein:

Figure 1 is a plan view of an axle assembly embodying by invention, only one half of the assembly being shown, inasmuch as it is duplicated in the other portion;

Figure 2 is a side elevational view of the assembly, and

Figure 3 is a free-body diagram utilized in explaining the function of the invention.

To achieve clarity, certain details have been omitted from various views where it is believed said details are not important to an adequate showing of the invention.

Unless otherwise noted, reference herein is made to one half of the assembly, it being understood that the structure mentioned is duplicated on the other side of the assembly.

Describing the invention in detail, an axle assembly generally designated 10, is utilized to support a related vehicle body by being disposed transversely of the body and secured to the underside thereof. Attachment of the assembly to the body is preferably accomplished by means of a bearing block, generally designated 12, which may be integral with or secured to the underside of the vehicle body and adjacent each side thereof by means of stud and nut connection utilizing the holes 14 of the bearing block 12. The bearing block 12 may be, as herein illustrated, of the demountable cap type having a cap 16 conventionally bolted at 17 to the lower portion 11 of the block 12. The lower portion 11 and the cap 16 define a transverse hole 18, which, with suitable bearings (not shown) provides journal connection for an axle, generally designated 20.

The axle 20 comprises a main shaft 22, which is pivotally associated with the bearing block 12 by being extended through the hole 18 and being rotatable therein. Outboardly of the block 12 a throw or crank arm 24 is formed to extend transversely of the shaft 22 and may be integral therewith or demountably keyed thereto.

Another shaft or spindle 26 is formed directionally paralleling the main shaft 22 and eccentrically carried thereby by means of rigid connection with the crank arm 24 at a point spaced transversely from the main shaft 22. It is to be noted that the spindle 26 may be formed integral with the crank arm 24 or may be demountably keyed thereto. The spindle 26 is formed to rotatably mount by conventional cup, cone, and bearings, an associated wheel (not shown).

Adjacent the inboard end of the spindle 26 a bearing surface 28 is provided. A brake flange or stator 30, having a centrally disposed hole 32 into which a bearing such as a bronze insert 33 may be press fitted, is in sleeved rotational engagement with the bearing surface 28 of the spindle 26. An annular ledge or abutment 34 is provided on the spindle 26 inboardly of the stator 30 to limit movement of the stator inwardly and prevent interference with the crank arm 24 during the action hereinafter described. A link or arm 35 is pivotally connected at one end to the stator 30 as at 37 and is pivotally connected at its other end as at 39 to a lug 41 extending from the bearing block 12.

It should be noted that the link 35 is bowed upwardly, that is, offset upwardly intermediate the pivots 37 and 39. This link structure coupled with the fact that the pivot 39 is located on the bearing block 12 forwardly of the axis of rotation of the center shaft 22 enables the crank 24 to rotate from the normal position illustrated through the vertical or bottomed position shown by the dotted lines in Figure 2. Thus the link arrangement accommodates full rotation of the crank 24 and allows for the full utilization of the torsional capacity of the spring.

In the structure above described the spindle 26, which is also the pivotal axis of the associated wheel, can be said to trail the center shaft 22 and rotate about the longitudinal axis of said center shaft. Herein lies the reason for the designation "trail type" axle assembly referred to above. It is to be noted that relative vertical movement between the related supporting wheel and the supported vehicle body is contemplated. To cushion this relative vertical movement the preferred form of the invention utilizes a helical spring 36 disposed to surround the axle 22 and to have one end 38 fixedly secured to the bearing block 12, as by reception in a complementary hole thereof. The other end of the helical spring 36 is fixedly secured to the axle 20 by means of a clip 42, which is welded to the main shaft 22, as shown in Figure 1. To insure proper cushioning action of the spring, a shoulder 44 is provided integral with the bearing block 12 and on its inboard side, to partially support the inside surface of the adjacent spring convolution. A ledge 46 is provided on the main shaft 22 to afford like support for the spring convolution adjacent the spring clip 42. It is to be noted that the preferred method of cushioning the relative movement of the supported vehicle body is not per se part of the invention and that other resilient devices could reasonably be utilized in combination with a "trail type" axle assembly.

The cushioning or resilient support offered to the carried vehicle body is due to the bending stress induced into and flexibly resisted by the spring 36 as the spindle 26 and the associated wheel move vertically relative to the vehicle body and consequently rotate the main shaft 22 of the axle 20.

In the art as practiced today, a braking mechanism to decelerate the related vehicle such as any conventional brake shoe (not shown), is attached to the brake stator 30 to operatively engage a braking surface such as a conventional drum (not shown) carried by the associated wheel (not shown). Also in the practiced art, the brake stator 30 is rigidly, that is nonrotatably, fixed to the spindle 26. Hence in a conventional "trail type" axle assembly, as the brakes are applied torque forces are set up in the axle assembly which are illustrated and explained by the modified free-body diagram of Figure 3.

In Figure 3 the point A designates the longitudinal axis of the center shaft 22 and the point B designates the longitudinal axis of the spindle 26. The line 24 denotes the crank arm and the line 30 denotes the brake stator which is usually rigidly secured to the spindle. The torque present in the stator during application of the brakes, in fact, consists of an infinite number of small forces tangentially disposed within the stator 30 about the axis of the spindle, point B. In summation, these forces and their operative direction may be indicated by the force couple T and P, disposed equidistant from the plane C, C which in turn is perpendicular to the arm 24. In magnitude T and P are equal, in moment about the point A, T is greater than P due to the variation in the moment arm from the moment center A. The result of this variation in moment about the moment center A, which is the longitudinal axis of the main shaft 22, is that during brake application the spindle 26 and the associated wheel are urged upwardly and in some instances tend to leave the ground, and also the supported body is urged to move relatively downwardly, that is to squat. In operation, during a given braking application, the braking pressure is frequently applied intermittently resulting in an extremely undesirable movement and oscillation of the associated body.

In operation of my novel structure, the stator 30, as noted above, is rotatable on the spindle 26, hence will not transmit braking torque to the axle assembly. The link 35 is operative to limit rotation of the stator 30 and transmits the torque forces within the stator to the associated vehicle by means of the connection to the bearing block 12. It is to be noted that the longitudinal axes of the shaft 22 and the spindle 26 and the axes of the pivotal connections 37 and 39 form the four corners of a parallelogram which rigidly limits simple rotation of the stator 30 about the spindle 26 for a given position of the spindle relative to the main shaft 22, and accommodates compound movement of the stator relative to the spindle during concurrent movement of the spindle 26 about the main shaft 22. The mentioned parallelogram also limits rotation of the spindle 26 and the main shaft 22 to an angular movement of less than 180 degrees, the position of the spindle shown in Figure 2 being the lower limit of movement. The result of this feature is that the necessity for positive stop lugs used in combination with a "trail type" axle has been eliminated.

Thus the novel structure herein disclosed effectively eliminates undesirable motion and oscillation of a vehicle body supported by a "trail type" axle assembly.

I claim:

1. In an axle assembly for supporting a related vehicle body, a bearing block connected to the body, a main shaft journaled for rotation in the block, a throw integrally formed with the shaft outboardly of the block extending transversely of the shaft on one side thereof, a spindle integrally formed on the throw at a point remote from the shaft and directionally paralleling same, a brake stator rotatably mounted on the spindle, a lug on the block spaced from the main shaft on a side thereof opposite the throw, a link having its opposite ends pivotally connected to the lug and the stator respectively, said link being bowed upwardly intermediate its ends to accommodate rotation of the throw to a vertical position.

2. In a complete unitary axle assembly, a bearing block, a main shaft journaled for rotation therein, a throw integrally formed with the shaft outboardly of the block and extending from one side thereof, a spindle integrally formed on the throw at a point remote from the shaft, a brake stator rotatably mounted on the spindle, a lug integrally formed on the block and extending outboardly therefrom, said lug being spaced from the main shaft on a side thereof opposite the throw, a link pivotally connecting the stator and lug and overlying the main shaft, and a spring sleeved over the main shaft inboardly of the block, said spring having its opposite ends connected to the shaft and to the bearing block.

ALBERT F. SEELIG, JR.

References Cited in the file of this patent

UNITED STATES PATENTS

| Number | Name | Date |
| --- | --- | --- |
| 2,426,513 | Linn | Aug. 26, 1947 |
| 2,542,261 | Probst | Feb. 20, 1951 |

FOREIGN PATENTS

| Number | Country | Date |
| --- | --- | --- |
| 420,433 | Great Britain | Dec. 3, 1934 |
| 447,076 | Great Britain | May 12, 1936 |